United States Patent
Kato

(10) Patent No.: US 6,873,585 B2
(45) Date of Patent: Mar. 29, 2005

(54) PLAYBACK APPARATUS FOR PLAYING CONTENT DATA, RECORDING MEDIUM READABLE BY THE PLAYBACK APPARATUS, AND PRODUCING METHOD OF THE RECORDING MEDIUM

(75) Inventor: Taku Kato, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 475 days.

(21) Appl. No.: 10/022,769

(22) Filed: Dec. 20, 2001

(65) Prior Publication Data

US 2002/0089911 A1 Jul. 11, 2002

(30) Foreign Application Priority Data

Dec. 21, 2000 (JP) ........................................ 2000-389063

(51) Int. Cl.⁷ ................................................ G11B 3/90
(52) U.S. Cl. .................. 369/53.21; 369/275.3
(58) Field of Search ...................... 369/47.12, 47.13, 369/53.2, 53.21, 53.22, 53.37, 53.41, 53.45, 83, 84, 124.07, 275.3

(56) References Cited

FOREIGN PATENT DOCUMENTS

EP       0813194 A2 * 12/1997

* cited by examiner

*Primary Examiner*—Paul W. Huber
(74) *Attorney, Agent, or Firm*—Oblon, Spivak, McClelland, Maier & Neustadt, P.C.

(57) ABSTRACT

A playback apparatus is provided with a reception section and/or a medium holder from which provision date information and playback-permitted period information are provided along with content data. The playback apparatus is also provided with a playback section which plays the content data on the basis of information provided from the reception section and/or the medium holder. With this structure, the playback apparatus plays the content data on the basis of the relationships between the provision date information and the playback-permitted period information. Hence, the playback of the content data can be controlled in accordance with the intention of the content provider.

6 Claims, 8 Drawing Sheets

PLAYBACK APPARATUS FOR PLAYING CONTENT DATA, RECORDING MEDIUM READABLE BY THE PLAYBACK APPARATUS, AND PRODUCING METHOD OF THE RECORDING MEDIUM

CROSS-REFERENCE OF THE RELATED APPLICATIONS

This application is based upon and claims the benefit of priority from the prior Japanese Patent Application No. 2000-389063, filed on Dec. 21, 2000, the entire contents of which are incorporated herein by reference.

BACKGROUND OF THE INVENTION

1. Field of the Invention

The present invention relates to a playback apparatus, a recording medium and a producing method of the recording medium, which are applied to the technical field wherein the playback of content data is controlled on the basis of playback period information attached to that content data.

2. Description of the Related Art

A content data playback apparatus can be provided with not only a content data playback function but also a clock function which uses an internal clock to display a date and time. A content data playback apparatus with such a clock function is in wide use.

To control the period of time during which content data is playable, it is thought to provide this type of playback apparatus with a playback control function. The playback control function is a function of controlling a playback-permitted period for each content data by comparing playback-permitted period information which a content provider assigns to content data with a value of the internal clock.

However, the above playback apparatus may have problems if the user can freely change the value of the internal clock. In this case, the user can change the value of the internal clock to set a playback-permitted period each time he or she wants to play content data. Although changing that value is somewhat troublesome to the user, it is nonetheless possible to play the content data for ever.

To solve this problem, it is thought to provide the playback apparatus with a so-called "absolute clock", which accurately measures time and does not allow the user to change the value. The absolute clock can accurately measure time over a period of one decade without reference to power outages which may occur in the meantime. However, the playback apparatus incorporating such an absolute clock is inevitably high in producing cost.

A "radio clock", which resembles the absolute value in function but is lower in terms of cost, is also known in the art. The radio clock regularly receives a radio wave representing a reference time and adjusts the present time of the clock in accordance therewith. Hence, the time indicated by the radio clock can be regarded as substantially accurate.

However, the radio clock is not reliable where it cannot receive radio waves. Since the playback apparatus is often used in indoor areas radio waves do not reach, it is not appropriate to incorporate the radio clock in the playback apparatus.

BRIEF SUMMARY OF THE INVENTION

Accordingly, an object of the present invention is to provide a playback apparatus, a recording medium and a producing method of the recording medium, which enable the playback of content data to be controlled in the manner desired by the content provider by use of a less-costly structure.

According to one aspect of the present invention, there is provided a content data playback apparatus comprising: providing means for providing not only content data but also provision date information and playback-permitted period information; and playback means for playing the content data on the basis of the information provided by the providing means.

Since the playback apparatus plays content data on the basis of the relationships between the provision date information and the playback-permitted period information, the structure required is not costly, and yet the playback of the content data can be controlled in the manner desired by the content provider. The structure required is not costly because what the present invention requires in addition to the structure of the conventional playback apparatus is nothing but a memory for storing provision date information.

According to the second aspect of the present invention, there is provided a recording medium storing content data beforehand and being readable by a computer. The recording medium comprises: provision date information which is checked by the computer to determine whether or not it is latest, and which is held in the computer when it is determined to be latest; and playback-permitted period information which is checked by the computer to determine whether or not a period corresponding to a latest value of the provision date information is satisfied, and which enables the content data to be played when the period is satisfied.

Thanks to these features, the recording medium, which produces advantages similar to those of the first aspect, can be realized readily and reliably.

According to the third aspect of the present invention, there is provided a producing method of the recording medium of the second aspect. The producing method comprises: preparing an unused-state recordable medium which can be subjected to recording only once; and recording provision date information and playback-permitted period information in the unused-state recordable medium along with content data.

Thanks to these features, the recordable medium according to the second aspect can be easily realized.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will now be described with reference to the accompanying drawings. In the embodiments described below, playback-permitted period information and provision date information are assigned to content data. The provision date information is time information representing a preparation date, a broadcast date or a sale date. However, the provision date information is not limited to this; it may be arbitrary time information representing a point of time between a day when content data C becomes ready for provision (i.e., the preparation date) and a day when it is provided (i.e., the broadcast date or sale date).

In any case, the playback apparatus updates the provision date information and records the latest date thereof. In the content data playback mode, the playback of the content data is controlled on the basis of both the recorded provision date information and the playback-permitted period information of content.

In other words, approximation information on the present date (provision date information) is provided along with content data. Owing to this feature, the playback can be controlled in accordance with the intention of the content provider (i.e., the playback-permitted period information), without incurring high cost.

Let us consider the case of a DVD-video disc (Digital Versatile Disc Video Disc) wherein the preparation date information (which is provision date information) indicates Jan. 1, 2000 and the playback-permitted period terminates on Mar. 31, 2000.

This DVD-video disc falls into the hands of the user after Jan. 1, 2000, but this date is recorded in the playback apparatus (DVD player) with which the DVD-video disc is played. If the DVD-video disc should fall into the hands of the user on Jan. 1, 2000, the preparation date information is set in such a manner that it represents a date that is before Dec. 31, 1999.

In any case, the value of the date memory represents the present day and time, and yet the structure the date memory employs is much less costly than the structure of an absolute clock. The playback of the content data is controlled on the basis of both the value of the date memory and the playback-permitted period information. When the present invention is reduced to practice, the "date", such as the provision date or the preparation date, may represent only a day; alternatively, it may represent both a day and a time.

First Embodiment

Figure 1A:
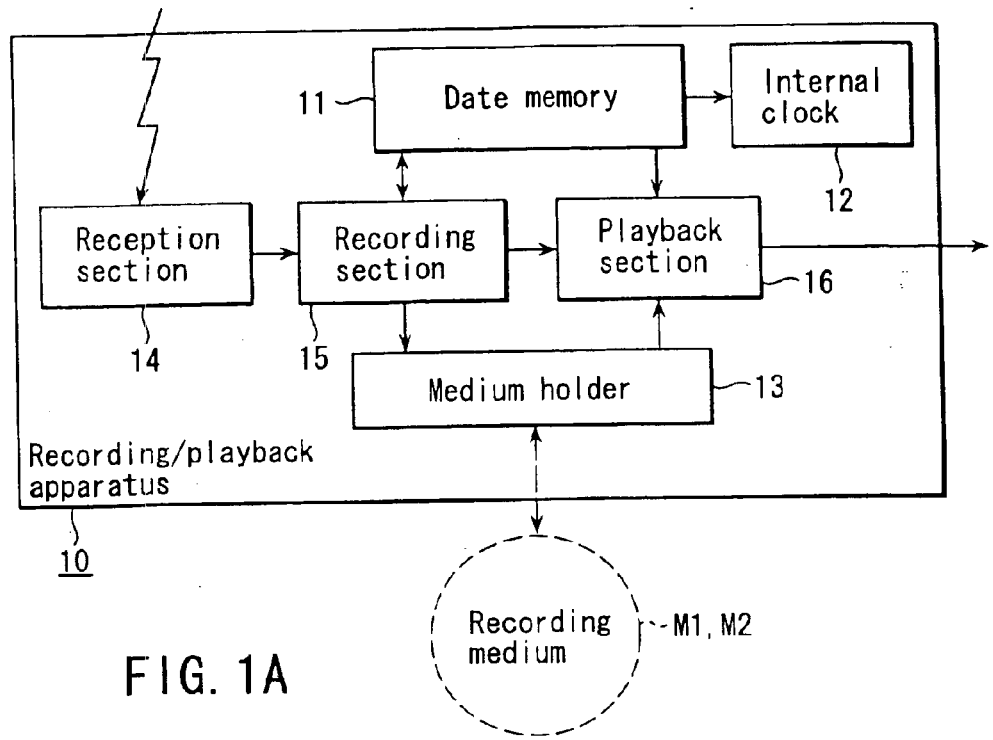
FIG. 1A is a schematic diagram illustrating recording/playback apparatus according to the first embodiment of the present invention.

FIG. 1A is a schematic diagram illustrating a playback apparatus according to the first embodiment of the present invention. The playback apparatus is provided with a recording function, and will therefore be referred to as a recording/playback apparatus. The recording/playback apparatus 10 includes a date memory 11, an internal clock 12, a medium holder 13, a reception section 14, a recording section 15 and a playback section 16.

The date memory 11 is preferably a nonvolatile memory. The date memory 11 allows the user to rewrite the data stored therein. In addition, the date memory 11 is configured to store latest preparation date information Dj as memory value T. Preparation date information Dj is one of preparation (broadcast) date information D1 to Dj handled by the recording/playback apparatus 10. If memory value Dj indicates a date prior to that represented by the preparation date information Di, then the memory value Dj is retained without being changed. In other words, the date memory 11 is configured to update the value stored therein only when a date value is greater (or later) than the presently-stored value.

The preparation date information D is prepared as information that is attached to each content data. The preparation date information D may be replaced with broadcast date information (or present date information) representing a later date, as long as the broadcast date information represents latest date information (a provision date) relating to the provision of content data C. Not only the preparation date information D described above but also a permitted-period end date is attached to the content data C.

Where content data C is stored in a prerecorded data medium M2 (such as a DVD-ROM disc) and provided to the user in this format, preparation date information D and permitted-period end date information E are also recorded in the prerecorded data medium M2.

Where the content data C is broadcast and is thereby provided to the user, the preparation date information D and the permitted-period end date information E are incorporated in a header or control information and broadcast in this state.

In any case, the preparation date information D and permitted-period end date information E must be provided from the content provider to the user along with the content data C.

To be precise, date information D and E do not indicate both "time" and "day" but solely "day" in each of the embodiments described below (the same applies to date information A described later). Instead of this, the date information may be used to indicate both "time" and "day."

The internal clock 12 is a clock set by the user. It measures the present time and displays "year", "day", "hour", "minute" and "second." The earliest date that can be measured by the internal clock is not prior to the memory value T of the date memory 11.

The medium holder 13 detachably holds either a readable/writable recordable medium M1 or a read-only prerecorded medium M2.

The recordable medium M1 is a readable/writable (data) recording medium in which content data C and a pair of preparation date information D and permitted-period end date information E are recorded. Recordable medium M1 is made of a DVD-RAM, a D-VHS, or the like.

The prerecorded medium M2 is a read-only data recording medium in which content data C and a pair of preparation date information D and permitted-period end date information E are recorded in advance. The prerecorded medium M2 is made of a CD-ROM, a DVD-ROM, or the like.

Figure 1B:
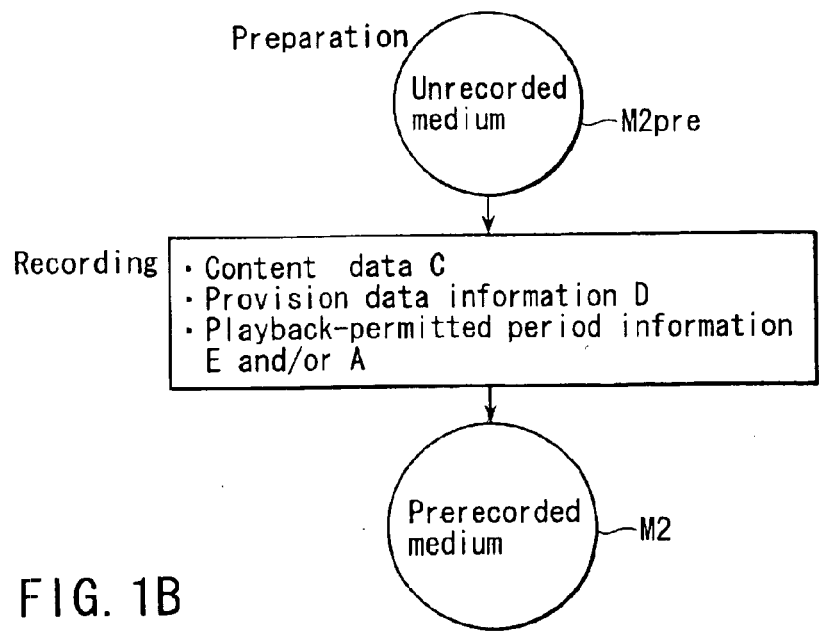
FIG. 1B is a schematic diagram illustrating a prerecorded medium M2 used in the embodiment.

When the prerecorded medium M2 is made, information may be recorded in it by use of a recording apparatus owned by the maker. Alternatively, the prerecorded medium M2 may be made by making a copy of a information-recorded master disc by means of a stamper or the like. In either case, the prerecorded medium M2 is prepared in the manner shown in FIG. 1B. As shown, an unused-state recording medium $M2_{pre}$ which can be subjected to recording only once is first prepared. Then, provision date information D and playback-permitted period information E (and/or A) are recorded in the unused-state recording medium $M2_{pre}$ along with content data C. The order in which the content data C and information D, E and A are recorded can be arbitrarily determined. The content data and information D, E and A may be recorded simultaneously or individually.

The reception section 14 receives broadcast content data C, preparation date information D, and permitted-period end date information E. Upon receipt of these, the reception section 14 sends them to the recording section 15. The medium holder 13 and/or the reception section 15 function as a providing means for providing content data, provision date information and playback-permitted period information.

The recording section 15 has the following functions (f15-1) to (f15-3):

(f15-1) a function of recording in the recordable medium M1 the content data C, preparation date information D and permitted-period end date information E which are received from the reception section 14;

(f15-2) a function of comparing the preparation date information D received from the reception section 14 with the memory value T stored in the date memory 11, and of updating the memory value T of the date memory on the basis of the preparation date information D if the preparation date information D indicates a date later than that of the memory value T (T<D).

(f15-3) a function of causing the playback section 16 to play the content data C received from the reception section 14.

The playback section 16 has the following functions (f16-1) to (f16-3):

(f16-1) a function of reading out the content data C, the preparation date information D and permitted-period end date information E from the recordable medium M1 or prerecorded medium M2 held by the medium holder 13, in the medium play mode. This readout function is realized by employing a light-emitting element, a light-receiving element, a magnetic head, or another structural component in accordance with the recording format of the recording medium. The data processing, which is after the data readout operation, is realized by an arbitrarily-determined hardware structure and/or software structure.

(f16-2) a function of comparing the readout permitted-period end date information E with the memory value T stored in the date memory 11, and of playing and outputting the content data C unless the memory value T indicates a date later than that of the permitted-period end date information E (T≦E).

(f16-3) a function of playing and outputting the content data C transmitted from the recording section 15, in the broadcast reception mode.

A description will now be given as to how the recording/playback apparatus operates. In the description below, reference will be made to the case where the content data is broadcast. Reference will also be made as to how the playback control is made when the content data C, after it is recorded, is viewed or listened to until the date represented by the permitted-period end date information.

Figure 2:
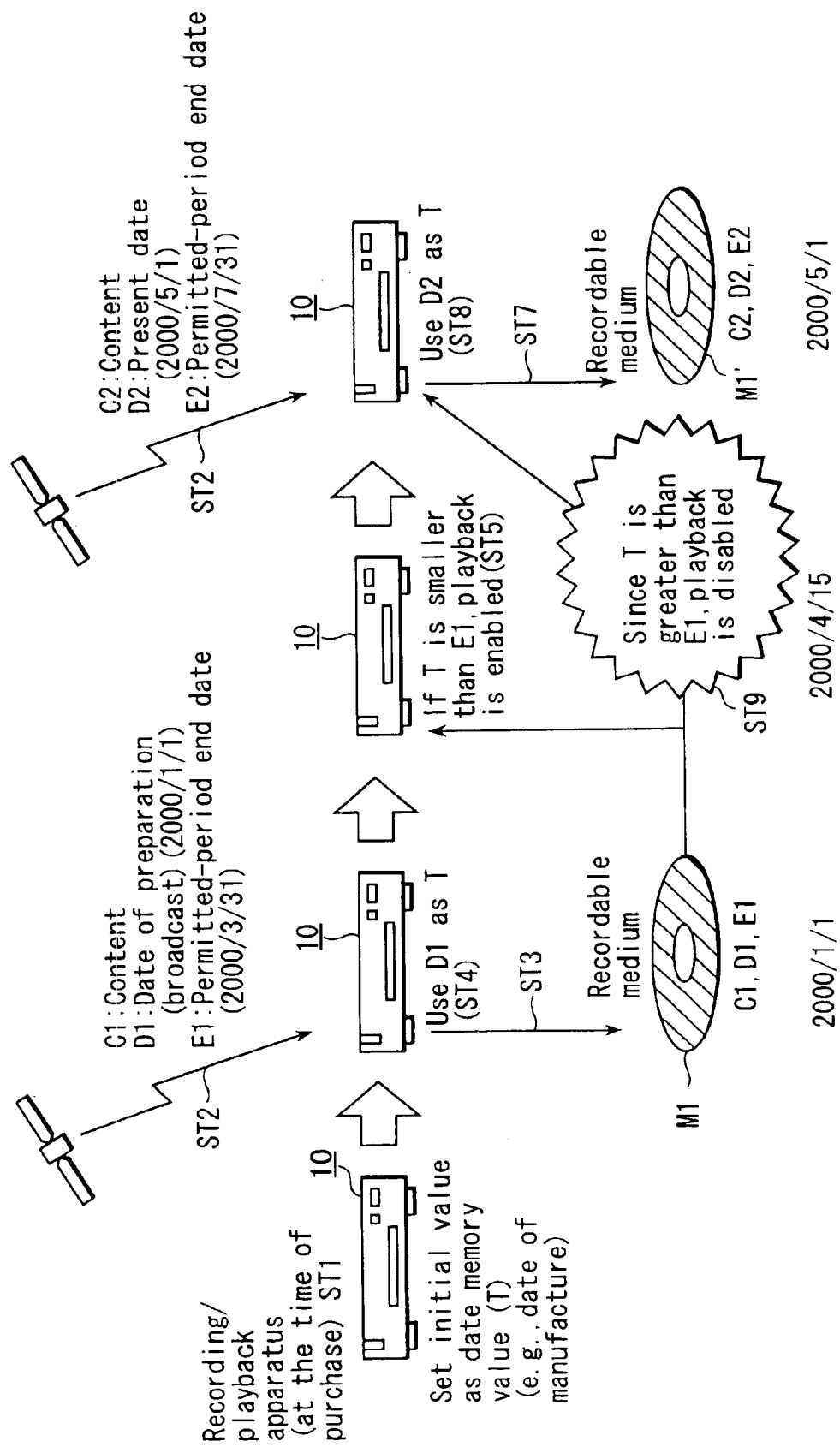
FIG. 2 is a schematic diagram illustrating an operation of the embodiment.

As shown in FIG. 2, the recording/playback apparatus 10 is shipped from the factory (the shipping date is Dec. 31, 1999, for example), with the date memory 11 set at the initial value (e.g., the date of manufacture or the date of shipment). Let us assume that the recording/playback apparatus 10 is purchased by the user on the same day (ST 1).

At the time of broadcast reception (e.g., Jan. 1, 2000), the recording/playback apparatus 10 receives content data C1, which incorporates both preparation (broadcast) date information D1 and permitted-period end date information E1 (ST 2). In response to reception, the recording section 15 records data C1, D1 and E1 in the recordable medium M1 (ST 3), and the value T of the date memory 11 is compared with the preparation date information D1. If the preparation date information D1 represents a date later than that of the value T, then the value T is replaced with the preparation date information D1 (ST 4). The received content data C is played and output by the playback section 16.

At the time of playback (which is an arbitrary time and is Apr. 15, 2000, for example), the recording/playback apparatus 10 causes the playback section 16 to compare the value T of the date memory 11 and the permitted-period end date information E1 stored in the recordable medium M1. Unless the value T represents a date later than the date of the permitted-period end date information E1, the content data C is played (ST 5).

At the time of broadcast reception (which is a time different from the first-time broadcast reception and is May 1, 2000, for example), the recording/playback apparatus 10 receives other content data C2, which incorporates both preparation date information D2 and permitted-period end date information E2 (ST 6). In response to reception, the recording section 15 records data C2, D2 and E2 in another recordable medium M1' (ST 7), and the value T of the date memory 11 is compared with the preparation date information D2. If the preparation date information D2 represents a date later than that of the value T, then the value T is replaced with the preparation date information D2 (ST 8). In this case, T=D1 <D2, which means that D2 represents a later date. The received content data C2 is played and output by the playback section 16.

Since the relationship E1<T (=D2) is satisfied thereafter, the recording/playback apparatus 10 can no longer play the content data C1 recorded in the recordable medium M1 in step ST 3 (ST 9).

Each time broadcast content data C is received (recorded), the operation defined in steps ST 2 to ST 5 is repeated. If the content data C1 that is recorded by a recording/playback apparatus (or a recording apparatus) is played by another recording/playback apparatus 10' (or a playback apparatus), similar processing is executed. In normal use, new content data can be played or recorded at any time desired, so that the date memory 11 of the recording/playback apparatus 10 is updated again and again. Therefore, old content data C can no longer be viewed or listened to if their permitted-period end dates E expire.

Figure 3:
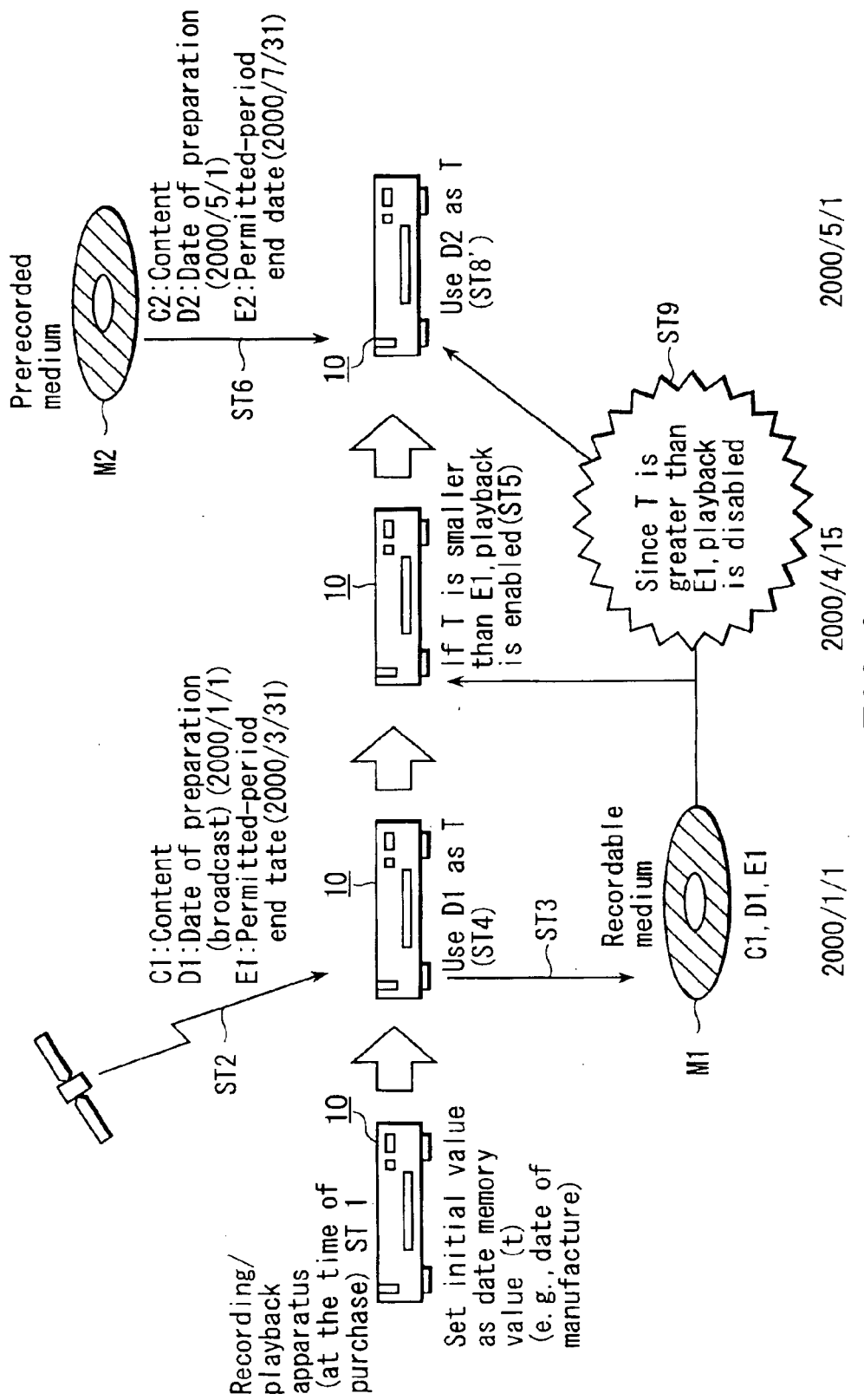
FIG. 3 is also a schematic diagram illustrating an operation of the embodiment.

As can be seen from FIG. 3, the recording/playback apparatus 10 functions similarly not only when the recordable medium M1 storing broadcast information is played but also when the prerecorded medium M2, such as a DVD-video disc, is played.

FIG. 3 illustrates an operation performed in the case where content data C2 recorded in the prerecorded medium M2 on May 1, 2000 is played, in place of the content data broadcast on the same day.

As shown in FIG. 3, when the prerecorded medium is played (e.g., on May 1, 2000), the recording/playback apparatus 10 holds the prerecorded medium 2 (ST 6'). At the time, the playback section 16 compares the value T of the date memory 11 with the permitted-period end date information E2 stored in the prerecorded medium M2. Unless the memory value T represents a date later than that of the permitted-period end date information E2, the content data C2 is played. In addition, the recording/playback apparatus 10 compares the value T of the date memory 11 with the preparation date information D2. If the comparison shows that the preparation date information D2 represents a later date (in which case, T=D1<D2, so that D2 represents a later date), the memory value T is replaced with the preparation date information D2 (ST 8').

Figure 4:
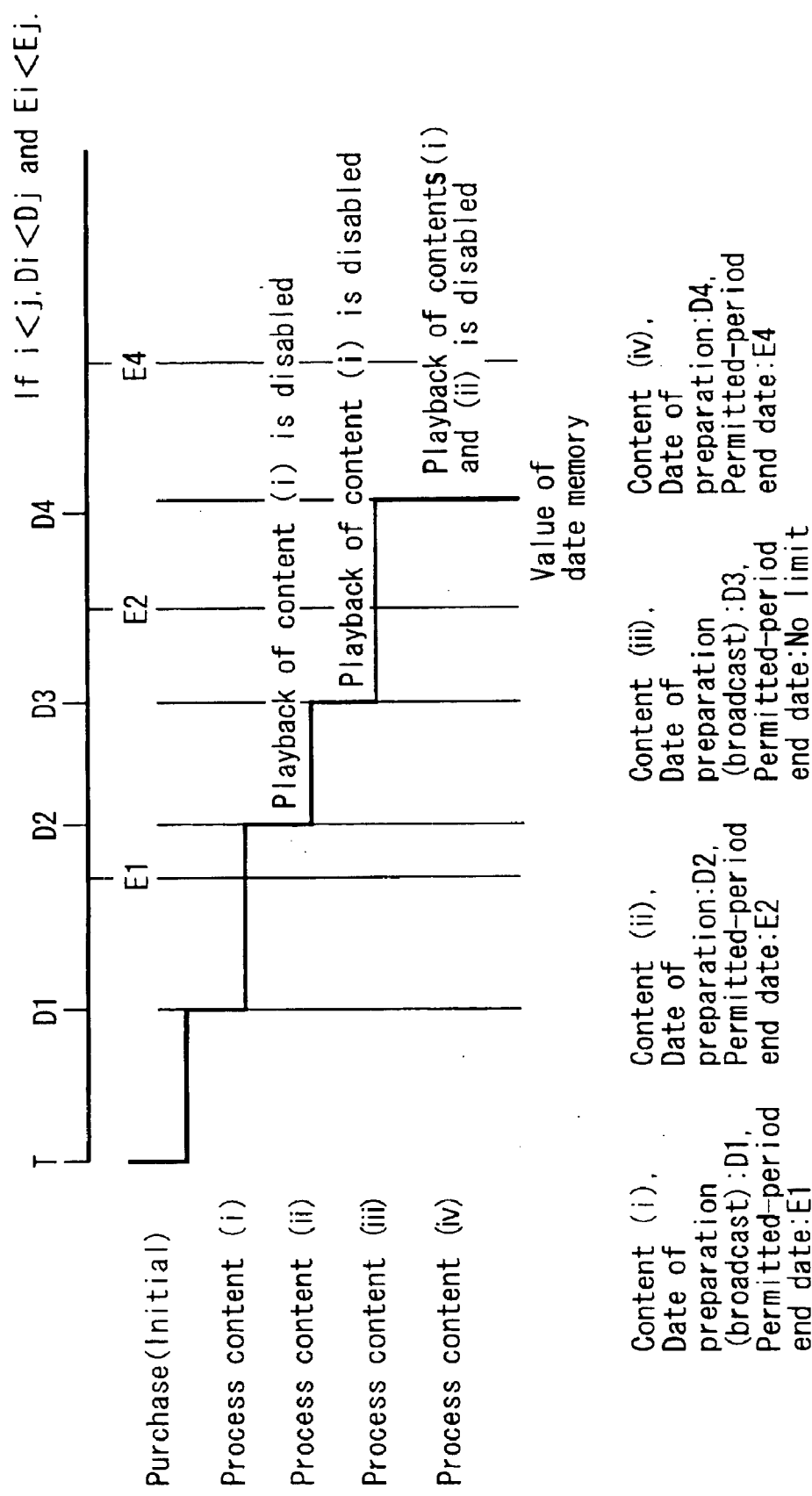
FIG. 4 is a timing chart illustrating an operation of the embodiment.

The above operation will be described in more detail with reference to the timing chart shown in FIG. 4. Let us assume that content data (i) to (iv) are provided to the user in this order. In this case, the value T of the date memory 11 changes as follows: D1→D2→D3→D4. The playback of content data (i), (ii) and (iv), the permitted-period end date information E1, E2 and E4 of which are before the corresponding ones of D1, D2, D3 and D4 of the date memory 11, is disabled. The permitted-period end date information E can be so determined as to represent "NO LIMIT", as in content data (iii). In this case, the content data (iii) can be played at any time.

As described above, the recording/playback apparatus 10 of the present embodiment plays content data C when the value T of the date memory 11, which is an approximate value of the present date, represents the permitted-period end date E. Owing to this feature, the structure of the embodiment is not costly and can be realized by merely adding the date memory to the structure of the conventional apparatus. Using this structure, the playback of content data can be controlled in such a manner as to follow the intention of the content provider.

The recording/playback apparatus 10 records provision date information D and playback-permitted period information E in a recordable medium M1 along with content data C. Where the content data C etc. is provided to the user through broadcasting, the content data C in the recordable medium M1 can be played as long as the permitted-period end date information E does not expire.

The playback control is not limited to that of broadcast content data C. It is applicable also to content data C provided in the form of recording mediums M1 and M2.

According to the present embodiment, the playback control is applied to two kinds of content data C: one is content data that is broadcast; and the other is content data that is provided in the form of recording mediums M1 and M2. Therefore, reference was made to the recording/playback apparatus 10 comprising both the reception section 14 and the recording section 15. It should be noted, however, that the present invention is applicable to the case where only the playback of the content data C provided in the form of recording mediums M1 and M2 is controlled. It should be also noted that the reception section 14 and the recording section 15 can be omitted, thereby providing a dedicated playback apparatus. In this case, the playback section 16 is provided with not only the comparison and playback functions but also an updating function of updating the date memory 11 of the recording section 15. Where the playback control is applied only to broadcast content data C, the medium holder 13 is omitted as well as the related recording function of the recording section 15, thereby providing a playback apparatus.

The present embodiment is particularly advantageous when it is applied to content data that should be provided with a certain kind of expiration date.

Second Embodiment

Figure 5:
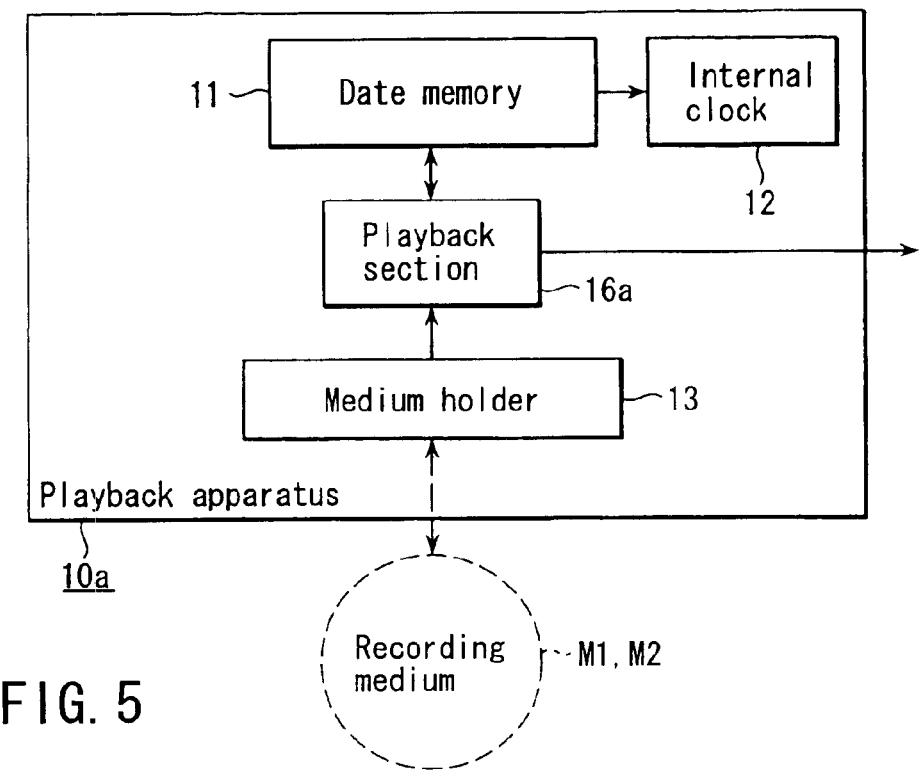
FIG. 5 is a schematic diagram illustrating a playback apparatus according to the second embodiment of the present invention.

FIG. 5 is a schematic diagram illustrating a playback apparatus according to the second embodiment of the present invention. The same references as used in FIG. 1A are used to denote similar or corresponding structural elements, and a detailed description of such elements will be omitted herein. Therefore, a description will be given of the features that distinguish the second embodiment from the first embodiment. Likewise, a repetitive description will be omitted in connected with the third and subsequent embodiments.

According to the second embodiment, content data C cannot be played at first, which is just the opposite to the first embodiment. The playback of the content data C is permitted after a use-period start date A. More specifically, the second embodiment does not employ a reception section 14 or a recording section 15, such as that used in the first embodiment. In place of the playback section 16 of the first embodiment, the second embodiment employs a playback section 16a that enables playback of content data C from the use-period start date A. To be more specific, the playback section 16a has the following functions (f16a-1) to (f16a-3):

(f16a-1) a function of reading out content data C, preparation date information D and use-period start date information A from a recordable medium M1 or a prerecorded medium M2 held by a medium holder 13.

(f16a-2) a function of comparing the readout preparation date information D with the memory value T stored in the date memory 11, and of updating the memory value T of the date memory on the basis of the preparation date information D when this information represents a date later than the memory value T (i.e., when the value of the information D is greater than the memory value: T<D).

(f16a-3) a function of comparing the readout use-period start date information A with the memory value T stored in the date memory 11, and of playing and outputting content data C when the date represented by the memory value T is later than the date represented by the permitted-period end date information E (i.e., A≦T, D).

In each of the recordable medium M1 and the prerecorded medium M2, use-period start date information A (not the permitted-period end date information E) is recorded along with content data C and preparation date information D.

A description will now be given as to how the playback apparatus of the above structure operates. In the description below, reference will be made to the playback control performed when the content data C recorded in the prerecorded medium M2 can be played from the date of the use-period start date information A.

Figure 6:
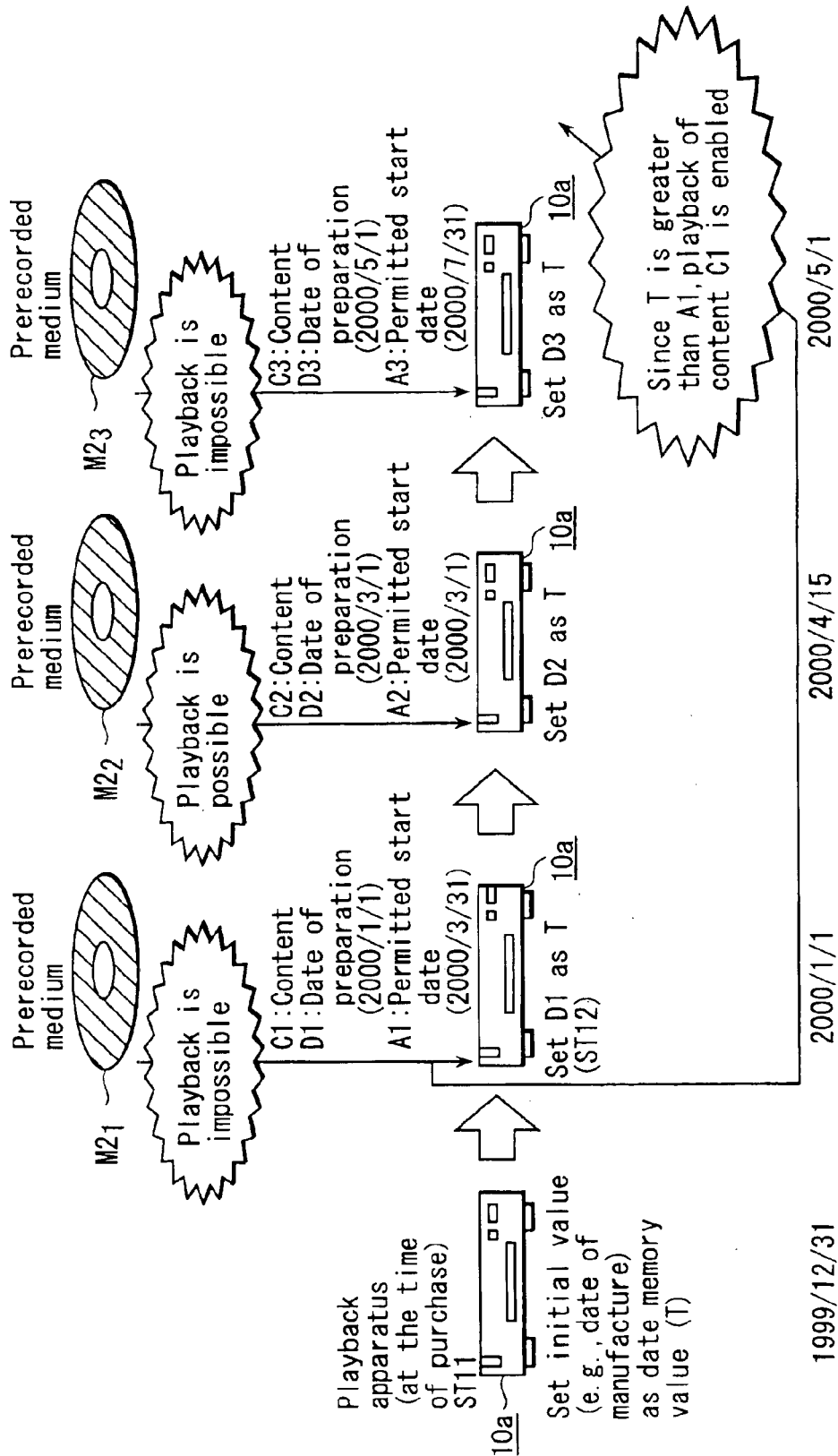
FIG. 6 is a schematic diagram illustrating an operation of the second embodiment.

As shown in FIG. 6, the playback apparatus 10 is shipped from the factory (the shipping date is Dec. 31, 1999, for example), with the date memory 11 set at the initial value (e.g., the date of manufacture or the date of shipment). Let us assume that the playback apparatus 10 is purchased by the user on the same day (ST 11).

When a first medium is played (e.g., on Jan. 1, 2000), the playback apparatus 10a plays the prerecorded medium $M2_1$, in which preparation date information D1, use-period start date information A1 and content data C1 are recorded. At the time, the playback section 16a compares the value T of the date memory 11 with the preparation date information D1. If the preparation date information D1 represents a date later than the date of the memory value T, then this value T is replaced with the preparation date information D1 (ST 12).

Next, the playback section 16a of the playback apparatus 10a compares use-period start date information A1 with the memory value D1 of the date memory 11 (ST 13). Since, in this case, the comparison shows that the date represented by the memory value D1 is prior to the date represented by the use-period start date information A1 (D1<A1), the playback of the content data C1 is disabled.

Thereafter, the updating processing of the memory value D is executed in step ST 12, and the playback enabling/disabling operation is performed based on the comparison processing of step ST 13.

When another medium is played (e.g., on Apr. 15, 2000), the playback section 16a of the playback apparatus 10a executes step ST 12 so as to update the memory value D1 on the basis of D2 (which represents Mar. 1, 2000, for example). When the playback section 16 executes step ST 13, the date represented by the memory value D2 is already after the date represented by the use-period start date information A2 (e.g., Mar. 1, 2000). Hence, the content data D2 is played.

When a third medium is played (e.g., on May 1, 2000), memory value D2 is replaced with memory value D3, but the date represented by this value is before the date represented by the use-period start date information A3. Hence, the playback of content data D3 is disabled.

When the third medium is played (on May 1, 2000), the date (May 1, 2000) represented by the memory value D3 is after the date (Mar. 31, 2000) represented by the use-period start date information A1 of the prerecorded medium M2$_1$. Therefore, the content data C1 of the first prerecorded medium M2$_1$ can be played at any time desired.

In normal use, what is played is new content data C, as described above. Therefore, the date memory 11 of the playback apparatus 10a is updated consecutively. In other words, the content data C, which cannot be played at first, becomes playable one after another.

Figure 7:
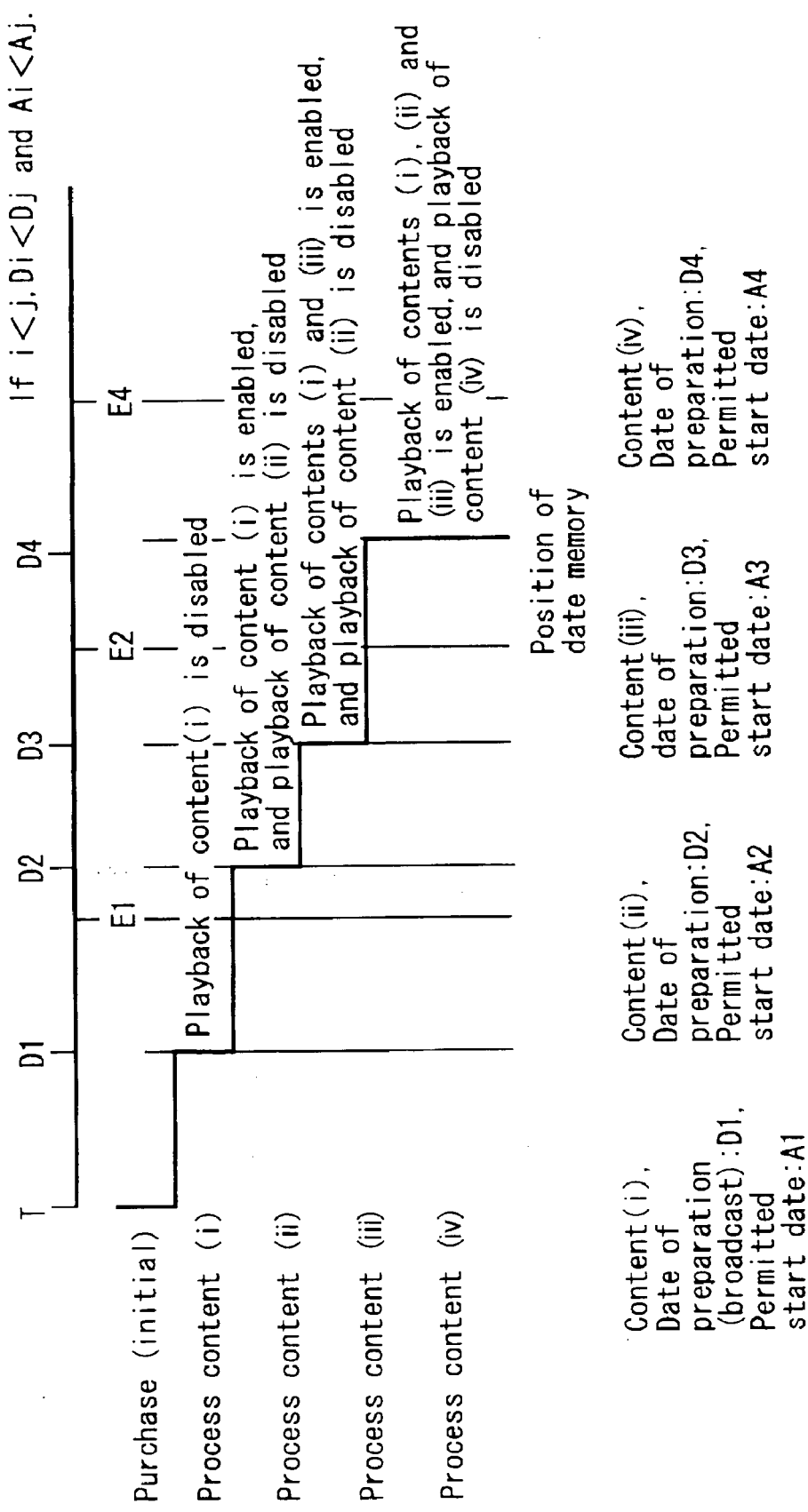
FIG. 7 is timing chart illustrating an operation of the second embodiment.

The above operation will now be described in more detail, with reference to the timing chart shown in FIG. 7. Let us assume that content data (i) to (iv) are provided to the user in this order. In this case, the value T of the date memory 11 changes as follows: D1→D2→D3→D4. The playback of content data (i), (ii) and (iii), the use-period start date information A1, A2 and A3 of which are after the corresponding ones of D1, D2, D3 and D4 of the date memory 11, is permitted. Although not shown, content data (iv) becomes playable when the value D of the date memory 11 represents a date that is after the date of the use-period start date information A.

As described above, the second embodiment produces advantages similar to those of the first embodiment. In particular, the playback control wherein data becomes playable after the use-period start date A is realized instead of the aforesaid playback control based on the permitted-period end date E. The second embodiment is advantageous particularly when content data on an unreleased movie is distributed beforehand and is made playable after the release date of that movie.

Third Embodiment

Figure 8:
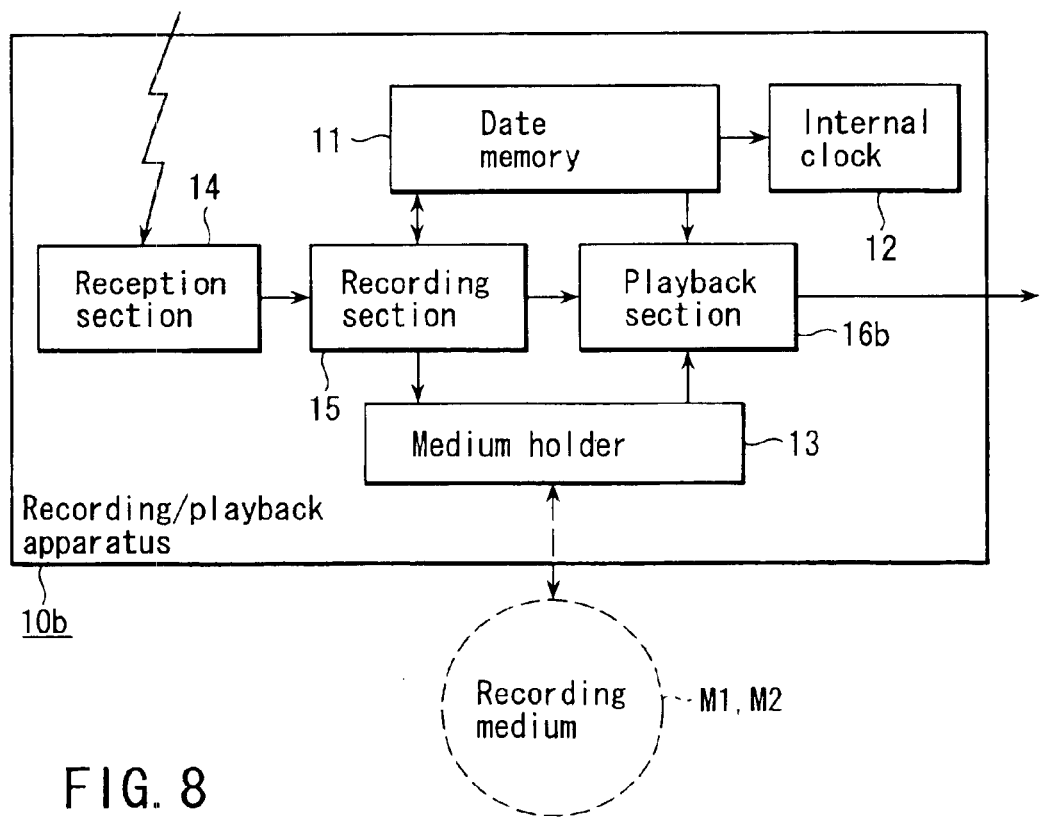
FIG. 8 is a schematic diagram illustrating a recording/playback apparatus according to the third embodiment of the present invention.

FIG. 8 is a schematic view illustrating a recording/playback apparatus according to the third embodiment of the present invention. The third embodiment is practically a modification of the first embodiment in that content data which cannot be played at first is made playable after the use-period start date A. The recording/playback apparatus can process broadcast content as well as a prerecorded medium M2.

As shown in FIG. 8, the recording/playback apparatus 10b of the third embodiment functions as a playback apparatus 10b in which the playback section 16 shown in FIG. 1A is replaced with playback section 16b. This playback section 16b enables content data C to become playable after the use-period start date A.

More specifically, the playback section 16b is provided with the following functions (f16b-1) to (f16b-3):

(f16b-1) a function of reading out the content data C, the preparation date information D and use-period start date information A from the recordable medium M1 or prerecorded medium M2 held by the medium holder 13, in the medium play mode.

(f16b-2) a function of comparing the readout use-period end start information A with the memory value T stored in the date memory 11, and of playing and outputting the content data C after the memory value T indicates a date later than the date of the use-period start date information.

(f16b-3) a function of playing and outputting the content data C transmitted from the recording section 15, in the broadcast reception mode.

The recording section 14 and the recording section 15 operate in a similar manner to that described above except that the permitted-period end date information E is replaced with the use-period start date information A.

In each of the recordable medium M1 and the prerecorded medium M2, use-period start date information A (not the permitted-period end date information E) is recorded along with content data C and preparation date information D.

A description will now be given as to how the recording/playback apparatus of the above structure operates.

Figure 9:
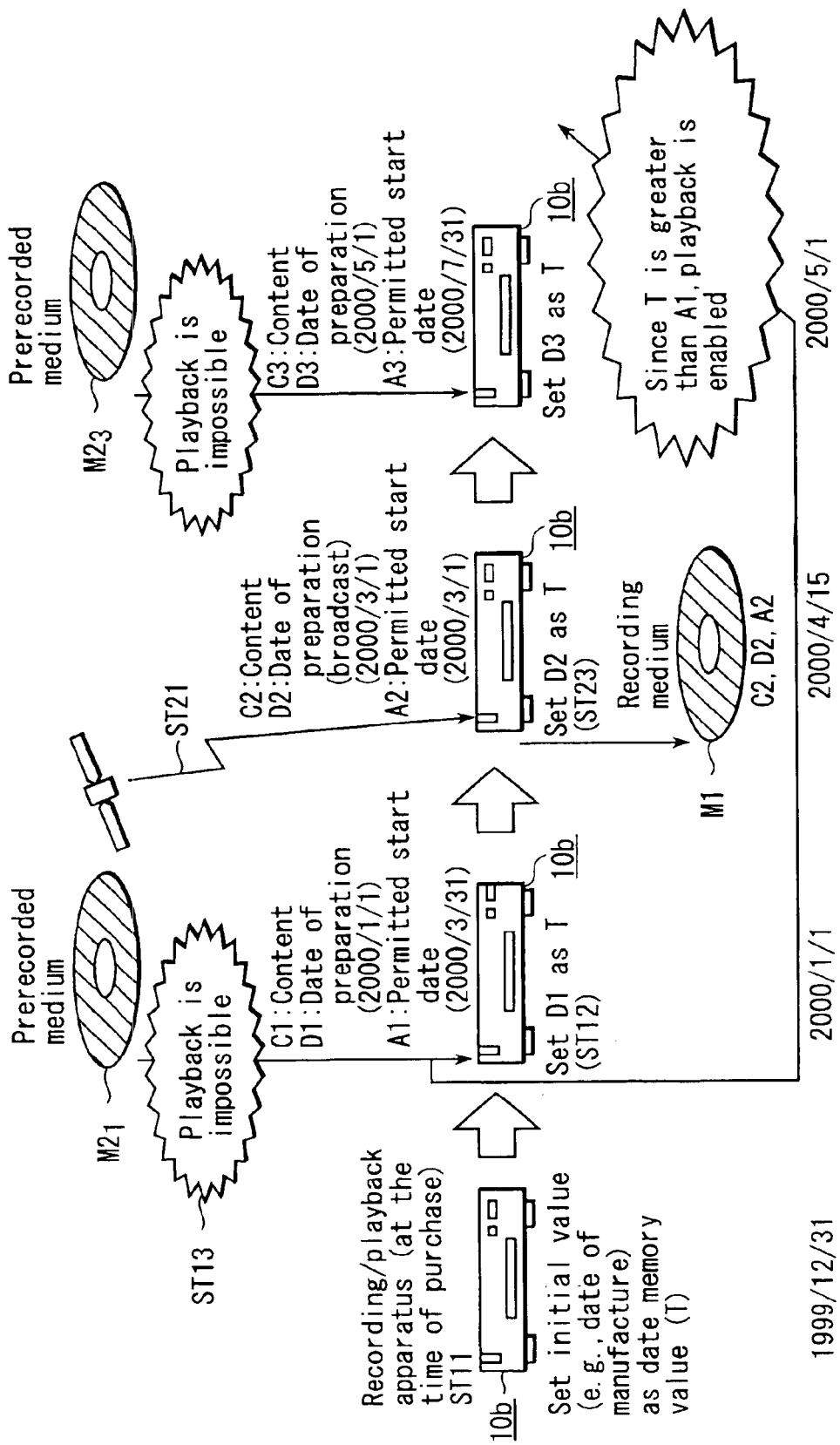
FIG. 9 is a schematic diagram illustrating an operation of the third embodiment.

As shown in FIG. 9, the recording/playback apparatus 10b functions in a similar manner to that illustrated in FIG. 6 when it is shipped from the factory (on Dec. 31, 1999, for example) and when it is used for playing a medium (on Jan. 1, 2000, for example).

At the time of broadcast reception (which is Mar. 1, 2000, for example), the recording/playback apparatus 10b receives content data C2, which incorporates both preparation (broadcast) date information D2 and use-period start date information A2 (ST 21). In response to reception, the recording section 15b records data C2, D2 and A2 in recordable medium M1 (ST 22), and the value T of the date memory 11 is compared with the preparation date information D2. If the preparation date information D2 represents a date later than that of the value T, then the value T is replaced with the preparation date information D2 (ST 23).

Then, the playback section 16b of the recording/playing apparatus 10b compares the use-period start date information A2 with the memory value D2 of the date memory 11. Since the comparison shows that the date represented by the memory value D2 is after the date represented by the use-period start date information A2 (A2≦D2), the content data C2 is played. It should be noted that the content data C2 stored in the recording medium M2$_2$ can be played at any time since the memory value D2 represents a date (Mar. 1, 2000) later than the date (Mar. 1, 2000) of the use-period start date information A2.

The memory value D2 is updated to D3 when another medium is played (on May 1, 2000, for example). Despite this, the playback of the content data D3 is disabled because D3<A3.

In normal use, the date memory 11 is sequentially updated each time new content data C is played. Therefore, content data C that cannot be played at first becomes playable.

As described above, the third embodiment produces similar advantages to those of the second embodiment. In addition, the third embodiment is advantageous particularly in that the playback of broadcast content data C can be controlled.

Fourth Embodiment

Next, a description will be given of a recording/playback apparatus according to the fourth embodiment of the present invention.

The fourth embodiment is an example of a manner in which the first to the third embodiments are combined.

To be more specific, the fourth embodiment combines the condition (T≦E) under which content data is played in the first embodiment with the condition (A≦T) under which content data is played in the second and third embodiments.

According to the fourth embodiment, content data C is playable where the playback condition is a combination of those stated above (i.e., A≦T≦E), i.e., where the value T of the date memory 11 is later than the use-period start date A and before the permitted-period end date E.

Thanks to this feature, the fourth embodiment produces the advantages of the first to third embodiments simultaneously. That is, content data is playable only in the period between the use-period start date A and the permitted-period end date E. Hence, the playback control is more flexible in the fourth embodiment than in the preceding embodiments. The fourth embodiment is particularly advantageous when content data C should be released only within a given period of time as in the case of promotion content.

The fourth embodiment can be modified such that it is applied to content data C which should not be released only within a specific period of time. In addition, two or more playback-permitted periods can be determined. For example, a first playback-permitted period having start and end dates may be combined with a second playback-permitted period having start and end dates in an arbitrary manner. Regardless of the manner in which a playback-permitted period is determined, the start and/or end date of this period is contained in playback-permitted period information. Hence, playback control can be performed in a desirable fashion in accordance with the playback-permitted period information.

The technology described in relation to the above embodiments can be embodied as a program executable by a computer. The program can be distributed to people after being stored in recording mediums, including a magnetic disk (e.g., a floppy disk or a hard disk), an optical disk (e.g., a CD-ROM or a DVD), a magneto-optical disk (MO) or a semiconductor memory.

The recording mediums can use any recording format as long as they can store a program and are readable by a computer.

An OS (Operating System) which a computer executes on the basis of a program installed on a computer from a recording medium, MW (middleware) such as database management software, network software, etc. may be part of the processing that realizes the present embodiment.

A playback apparatus according to the present invention covers not only an apparatus whose function is limited to playback (namely, a playback apparatus) but also an apparatus provided with a recording function as well (recording/playback apparatus).

Moreover, a recording medium used in the present invention is not limited to a medium that is independent of a computer; it may be any kind of recording medium as long as it can store or temporarily store a program downloaded from a LAN or the Internet.

Two or more recording mediums may be used. In other words, the present invention covers the case where the processing of the embodiment is executed by use of two or more recording mediums. It should be also noted that the recording mediums may be of any structure as long as they fulfill the functions required.

The computer used in the present invention executes the processing on the basis of the program stored in a storage medium. As long as this function is satisfied, the computer may be of any structure. It may be a single personal computer, a system wherein a plurality of apparatuses are connected as a network, etc.

The computer used in the present invention is not limited to a personal computer; it may be an operation executing apparatus, a microcomputer or the like that is included in an information processing apparatus. The concept "computer" used in the present invention is intended to mean any kind of apparatus or device that can achieve the functions of the present invention on the basis of a program.

The present invention is not limited to the embodiments described above. When reduced to practice, each of the embodiments described above can be modified in various manners without departing from the spirit of the invention. The embodiments described above can be combined, if so desired. In such a combination, advantages produced may be unique to that combination. It should be noted that the embodiments contain inventions of various stages, and the structural elements of the inventions can be modified to derive other inventions. If an invention is derived by omitting some structural elements from the embodiments, the omitted structural elements can be compensated for with known technology when the derived invention is reduced to practice.

Lastly, the present invention can be modified in various manners without departing from the spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A playback apparatus for playing content data, comprising:

means for reading the content data, provision date information, and playback-permitted period information;

a date memory configured to store the provision date information read by the means for reading, the provision date information read by the means for reading representing a latest value;

means for preventing the provision date information stored in the date memory from being updated, when the value of the provision date information stored in the date memory is later than that of the provision date information that is being read by the means for reading; and means for playing the content data when the provision date information stored in the date memory corresponds to the playback-permitted period information.

2. A playback apparatus according to claim 1, further comprising:

a medium holder configured to detachably hold a recording medium which is externally provided; and means for recording provision date information and playback-permitted period information along with the content data, in the recording medium held by the medium holder.

3. A playback apparatus according to claim 1, wherein said playback-permitted period information represents an end date of a playback-permitted date and/or a start date thereof.

4. A recording medium storing content data beforehand and being readable by a playback apparatus, said recording medium comprising:

provision-date information configured to be checked by the playback apparatus and determined to be latest or not, said provision date information being stored in a date memory in the playback apparatus only when the provision date information is determined to be latest; and playback-permitted period information configured to be checked by the playback apparatus to determine whether or not the latest value of the provision date information stored in the date memory corresponds to the playback-permitted period information, and to enable playback of the content data when said latest value of the provision date information stored in the date memory corresponds to the playback-permitted period information.

5. A producing method for producing a recording medium described in claim 4, said producing method comprising:

preparing an unused-state recording medium which can be subjected to recording only once; and recording the provision date information and the playback-permitted period information in the unused-state recording medium along with the content data.

6. A playback apparatus for playing content data, comprising:

means for reading the content data, provision date information, and playback-permitted period information;

a date memory configured to store the provision date information read by the means for reading, the provision date information read by the means for reading representing a latest value;

means for preventing the provision date information stored in the date memory from being updated, when the value of the provision date information stored in the date memory is later than that of the provision date information that is being read by the means for reading; and means for stopping the playing of the content data when a value represented by the provision date information stored in the date memory does not correspond to the playback-permitted period information.

* * * * *